(12) United States Patent
Kojima et al.

(10) Patent No.: US 10,314,108 B2
(45) Date of Patent: Jun. 4, 2019

(54) RELAY APPARATUS AND RELAY METHOD

(71) Applicant: FUJITSU LIMITED, Kawasaki-shi, Kanagawa (JP)

(72) Inventors: Yuji Kojima, Kawasaki (JP); Kenichi Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/638,605

(22) Filed: Jun. 30, 2017

(65) Prior Publication Data

US 2018/0027609 A1      Jan. 25, 2018

(30) Foreign Application Priority Data

Jul. 19, 2016  (JP) .................................. 2016-141695

(51) Int. Cl.
| | |
|---|---|
| *H04W 88/04* | (2009.01) |
| *H04J 3/06* | (2006.01) |
| *H04J 3/14* | (2006.01) |
| *H04L 12/40* | (2006.01) |
| *H04L 12/437* | (2006.01) |
| *H04W 40/02* | (2009.01) |
| *H04L 29/08* | (2006.01) |

(52) U.S. Cl.
CPC ........... *H04W 88/04* (2013.01); *H04J 3/0638* (2013.01); *H04J 3/14* (2013.01); *H04L 12/4011* (2013.01); *H04L 12/437* (2013.01); *H04W 40/02* (2013.01); *H04L 67/327* (2013.01)

(58) Field of Classification Search
CPC ..... H04W 88/04; H04W 40/00; H04W 40/02; H04L 12/437; H04L 12/4011; H04L 67/327; H04J 3/0638; H04J 3/14

USPC ......................................................... 370/401
See application file for complete search history.

(56) References Cited

U.S. PATENT DOCUMENTS

| | | | | |
|---|---|---|---|---|
| 2005/0276221 A1* | 12/2005 | Olesinski | ................ | H04L 47/10 370/235 |
| 2009/0024795 A1* | 1/2009 | Kobara | ............... | G06F 12/0864 711/118 |
| 2009/0116485 A1* | 5/2009 | Sasaki | ..................... | H04L 45/00 370/392 |
| 2013/0073666 A1* | 3/2013 | Matoba | ............. | G06F 17/30041 709/213 |
| 2015/0172413 A1 | 6/2015 | Yoneda et al. | | |
| 2015/0373162 A1* | 12/2015 | Mosko | .................... | H04L 69/22 370/392 |
| 2018/0019952 A1* | 1/2018 | Li | ........................... | H04L 47/12 |

FOREIGN PATENT DOCUMENTS

| | | |
|---|---|---|
| JP | 2013-179482 | 9/2013 |
| JP | 2015-136098 | 7/2015 |

* cited by examiner

*Primary Examiner* — Rownak Islam
(74) *Attorney, Agent, or Firm* — Staas & Halsey LLP

(57) ABSTRACT

There is provided a relay apparatus including a memory, and a processor coupled to the memory and the processor configured to receive a first packet including an identifier for indicating a content, determine whether or not the content indicated by the identifier included in the first packet is saved in a cache, transmit a second packet including a source address of the first packet and the identifier when it is determined that the content is not saved in the cache, and transmit a third packet including an address of the relay apparatus and the identifier when it is determined that the content is saved in the cache.

10 Claims, 11 Drawing Sheets

FIG.5

CONVERSION TABLE #3

| Face | IP ADDRESS |
|---|---|
| Face#2 | 192.168.2.1 |
| Face#4 | 192.168.4.1 |
| TempFace#1 | 192.168.1.1 |

RELAY APPARATUS AND RELAY METHOD

CROSS-REFERENCE TO RELATED APPLICATION

This application is based upon and claims the benefit of priority of the prior Japanese Patent Application No. 2016-141695, filed on Jul. 19, 2016, the entire contents of which are incorporated herein by reference.

FIELD

The embodiments discussed herein are related to a relay apparatus and a relay method.

BACKGROUND

In recent years, for example, a network technology called content centric networking (CCN) has been known for distributing contents such as videos and audios. CCN is also called, for example, information centric networking (ICN) or named data networking (NDN). CCN allows a user to acquire desired contents by using a contents name indicating the desired contents as a key without being conscious of the location of a server in which the desired contents are stored.

A user terminal transfers an Interest packet including the content name indicating the desired contents to the server via a relay node in a network. The relay node relays the Interest packet by Hop-by-Hop communication. Then, when the Interest packet is received, the server acquires the contents corresponding to the contents name in the Interest packet from a storage destination. The server transfers the contents to each relay node on a path through which the Interest packet is transferred. When the contents are received, each relay node stores the received contents in a cache. Then, the relay node transfers the contents stored in the cache to the user terminal.

Related technologies are disclosed in, for example, Japanese Laid-Open Patent Publication No. 2013-179482 and Japanese Laid-Open Patent Publication No. 2015-136098.

SUMMARY

According to an aspect of the invention, a relay apparatus includes a memory, and a processor coupled to the memory and the processor configured to receive a first packet including an identifier for indicating a content, determine whether or not the content indicated by the identifier included in the first packet is saved in a cache, transmit a second packet including a source address of the first packet and the identifier when it is determined that the content is not saved in the cache, and transmit a third packet including an address of the relay apparatus and the identifier when it is determined that the content is saved in the cache.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an explanatory view illustrating an example of the entry configuration of a conversion table;

DESCRIPTION OF EMBODIMENTS

Each relay node in a CCN system may set whether or not a cache is required, that is, whether or not to save received contents in a cache, based on a predetermined algorithm. That is, in a relay node on a path through which an Interest packet is transferred, received contents are saved in a cache when the cache is required, but the received contents are not saved in a cache when the cache is not required. Therefore, it is unnecessary to transfer the received contents to a relay node in which the cache is not required among a plurality of relay nodes on the path through which the Interest packet is transferred.

However, since the received contents are also transferred to the relay node in which the cache is not required, the time required for transferring the received contents becomes long, and the transfer rate of the received contents is lowered. Therefore, an optimal routing may be performed to increase the transfer rate of the received contents.

Embodiments of a relay apparatus and a relay method capable of increasing a transfer rate will be described in detail below with reference to accompanying drawings. However, the disclosed technology is not limited by these embodiments. Further, these embodiments may be appropriately combined with each other within a scope that does not cause inconsistency.

First Embodiment

Figure 1:
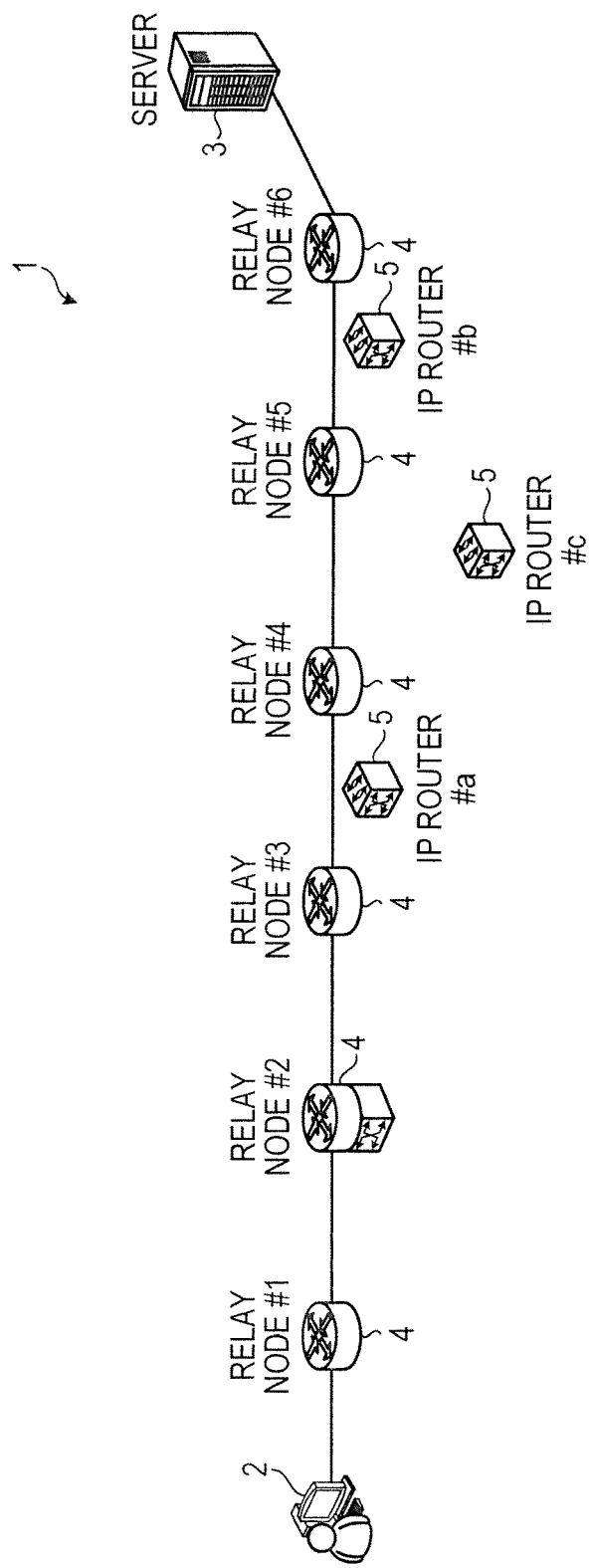
FIG. 1 is an explanatory view illustrating an example of a CCN system according to a first embodiment.

FIG. 1 is an explanatory view illustrating an example of a CCN system 1 according to a first embodiment. The CCN system 1 illustrated in FIG. 1 includes a user terminal 2, a server 3, a plurality of relay nodes 4, and a plurality of IP routers 5. The user terminal 2 is a communication terminal used by a user, for example, a personal computer, a smartphone or the like. The server 3 is a server that stores contents. The relay nodes 4 are CCN-compliant relay nodes that connect between the user terminal 2 and the server 3. For convenience of explanation, the relay nodes 4 illustrated in FIG. 1 are assumed as six relay nodes 4 of #1 to #6. The IP routers 5 are IP-compliant routers that connect between the user terminal 2 and the server 3. For convenience of explanation, the IP routers 5 illustrated in FIG. 1 are assumed as three IP routers 5 of #a to #c. Not only the relay nodes 4 but also the IP routers 5 are in a state of being mixed between the user terminal 2 and the server 3. The relay nodes 4 relay signals by Hop-by-Hop communication.

Figure 2:
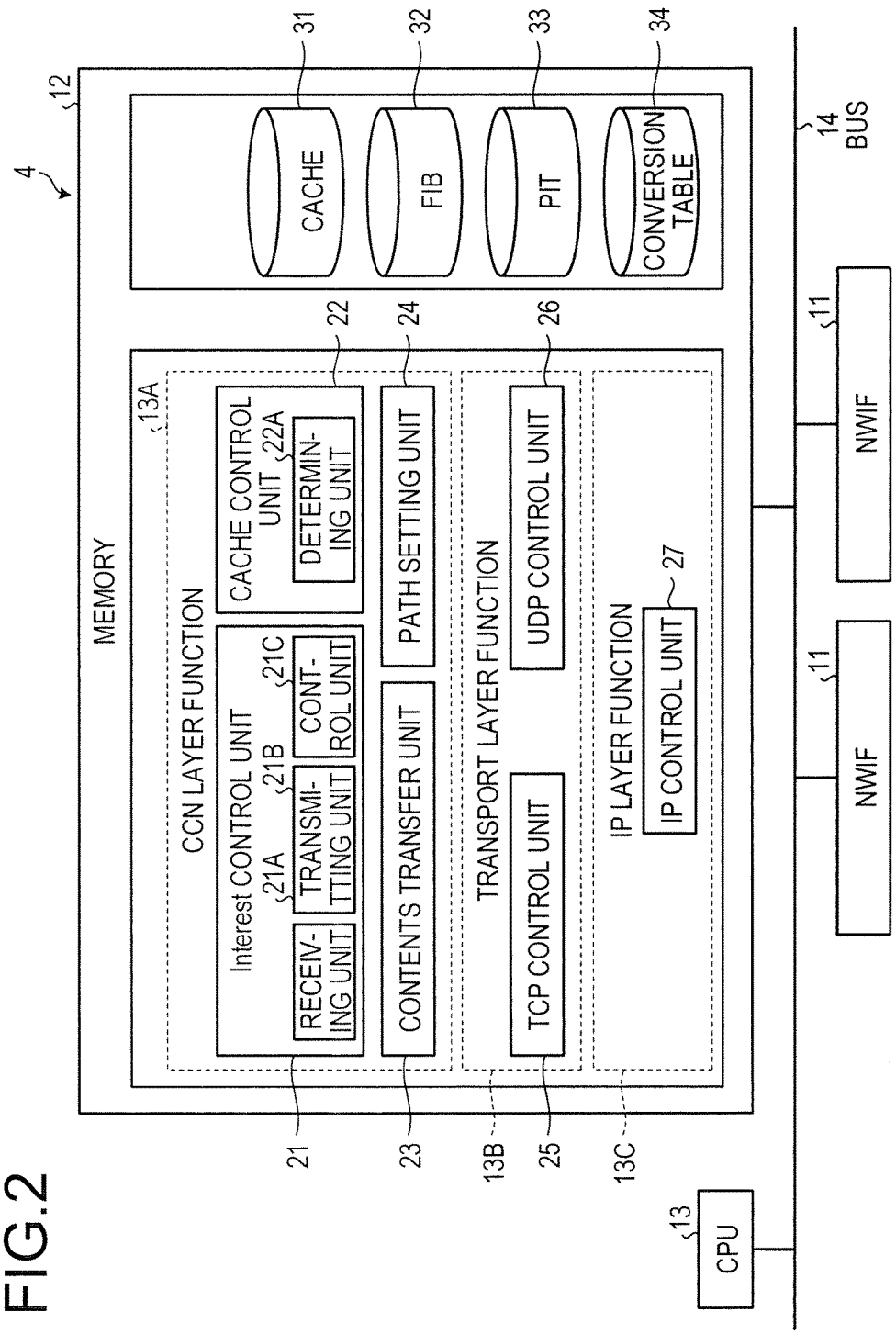
FIG. 2 is an explanatory view illustrating an example of a relay node.

FIG. 2 is an explanatory view illustrating an example of a relay node 4. As illustrated in FIG. 2, the relay node 4 includes a network interface (NWIF) 11, a memory 12, a control processing unit (CPU) 13, and a bus 14. The NWIF 11 is, for example, an IF responsible for communication with the user terminal 2, the server 3, the relay nodes 4, the IP routers 5 and so on. The memory 12 is an area storing various programs and information related to the relay nodes 4. The CPU 13 controls the entire relay nodes 4. The bus 14 is a bus that mutually communicates data between the NWIF 11, the memory 12, and the CPU 13. The relay node is an example of a relay apparatus.

In addition, the functions executed by the CPU 13 in the memory 12 include a CCN layer function 13A, a transport layer function 13B, and an IP layer function 13C. The CCN layer function 13A is a function executed with the protocol of the CCN layer. The transport layer function 13B is a function executed with the protocol of the transport layer. The IP layer function 13C is a function executed with the protocol of the IP layer.

The CCN layer function 13A includes an Interest control unit 21, a cache control unit 22, a contents transfer unit 23, and a path setting unit 24. The Interest control unit 21 generates an Interest packet for requesting the server 3 to provide contents. The cache control unit 22 includes a determination unit 22A. The determination unit 22A determines whether or not to cache received contents, based on a predetermined algorithm. The "predetermined algorithm" used herein refers to an algorithm for estimating popular contents from the number of times of contents request to determine whether or not a cache is required. Therefore, the cache control unit 22 may decide whether to cache the contents corresponding to a contents name in the Interest packet, based on the contents name. When it is determined by the determination unit 22A that a cache is required, the cache control unit 22 saves the received contents in a cache 31. The contents transfer unit 23 transfers the received contents. The path setting unit 24 sets a short cut path based on a pending information table (PIT) and a conversion table to be described later.

The transport layer function 13B includes a transmission control protocol (TCP) control unit 25 and a user datagram protocol (UDP) control unit 26. When the quality of service (QoS) of a section path set by the path setting unit 24 has no bandwidth guarantee, the TCP control unit 25 establishes, as the protocol of the transport layer, for example, a TCP connection that executes congestion control, retransmission control, etc., on the section path. When the QoS of the section path set by the path setting unit 24 has any bandwidth guarantee, the UDP control unit establishes, as the protocol of the transport layer, for example, a UDP connection with small processing load, on the section path without executing congestion control, retransmission control, etc. The IP layer function 13C has an IP control unit 27 that executes the IP protocol.

Figure 3:
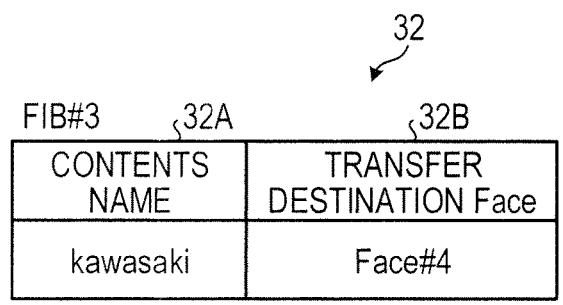
FIG. 3 is an explanatory view illustrating an example of the entry configuration of FIB.

Further, an area in the memory for storing various data includes a cache 31, a forwarding information base (FIB) 32, a PIT 33, and a conversion table 34. The cache 31 is an area for caching received contents. The FIB 32 is a table for storing Face when transferring the Interest packet corresponding to the content name to the next hop. The "Face" used herein is equivalent to IF in the CCN technology. FIG. 3 is an explanatory view illustrating an example of the entry configuration of the FIB 32. FIG. 3 illustrates a #3 FIB 32 in a #3 relay node 4. The #3 FIB 32 illustrated in FIG. 3 is an area for storing a contents name 32A and a transfer destination Face 32B in association with each other. The contents name 32A is an identifier for identifying contents. The transfer destination Face 32B is Face of a transfer destination to which the received Interest packet is transferred.

Figure 4:
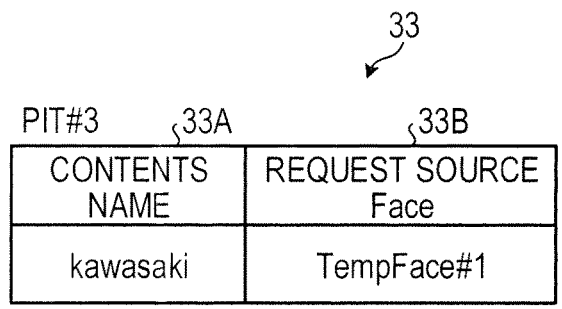
FIG. 4 is an explanatory view illustrating an example of the entry configuration of PIT.

The PIT 33 is a table used when the received contents are transferred. FIG. 4 is an explanatory view illustrating an example of the entry configuration of a #3 PIT 33. FIG. 4 illustrates the #3 PIT 33 in the #3 relay node 4. The #3 PIT 33 illustrated in FIG. 4 is an area for storing a contents name 33A and a request source Face 33B in association with each other. The contents name 33A is an identifier for identifying contents. The request source Face 33B is a request source Face of the Interest packet, that is, a transfer destination Face when the received contents are transferred.

The conversion table 34 is a Face-IP conversion table used when the request source Face and the IP address are converted. FIG. 5 is an explanatory view illustrating an example of the entry configuration of the conversion table 34. FIG. 5 illustrates the conversion table 34 in the #3 relay node 4. The #3 conversion table 34 illustrated in FIG. 5 is an area for storing a Face 34A and an IP address 34B in association with each other. The Face 34A is a transfer destination Face when the received contents are transferred. The IP address 34B is an IP address corresponding to the transfer destination Face.

Each of the relay nodes 4 divides the received contents into, for example, a predetermined number of divided data, sequentially stores the divided data in a payload within an IP packet, and sequentially transfers a predetermined number of IP packets to the relay node 4 of the next hop. The transport layer function 13B in the relay node 4 uses the IP layer function 13C to sequentially receive a predetermined number of IP packets from the relay node 4 and acknowledges delivery of the predetermined number of IP packets. Then, after the acknowledgment of delivery of the IP packets, the CCN layer function 13A in the relay node 4 aggregates the divided data in the predetermined number of IP packets, as received contents, and stores the received contents in the cache 31. On the other hand, even when the IP router 5 of the IP layer is used on a path on which the received contents are transferred, it is possible to suppress the transfer rate of the received contents from being decreased. The reason for that is because the IP router 5 transfers the IP packets without aggregation or division.

The Interest control unit 21 includes a receiving unit 21A, a transmitting unit 216, and a control unit 21C. The receiving unit 21A receives an Interest packet from the previous hop. When it is determined that a cache is not required, that is the received contents are not saved in the cache, the transmitting unit 21B determines whether or not a shortcut IP in the Interest packet is added. When it is determined that the shortcut IP is not added, the transmitting unit 21B adds an IP address of the previous hop to an additional area of the shortcut IP and transmits the Interest packet with the IP address added thereto to the next hop. When it is determined that the shortcut IP is added, the transmitting unit 21B transmits the Interest packet as it is to the next hop without changing the shortcut IP. When it is determined that a cache is required, that is the received contents are saved in the cache, the transmitting unit 21B deletes the shortcut IP in the Interest packet, adds the IP address of its own device to a source address in the Interest packet, and transmits the Interest packet with the IP address as the source address to the next hop.

The control unit 21C activates an aging timer at a timing referring to the PIT 33 and the request source Face in the conversion table 34. When the aging timer is timed-up (i.e., expires), the control unit 21C deletes the entry of the request source Face from the PIT 33. Further, when the aging timer is timed-up, the control unit 21C deletes the entry of the IP address corresponding to the request source Face from the conversion table 34. As a result, since the entries which are not used for a long time in the PIT 33 and the conversion table 34 are deleted, the memory capacity in the PIT 33 and the conversion table 34 may be saved. When the request source Face is referred to again during the counting of the aging timer, the control unit 21C resets the counting aging timer.

Figure 6:
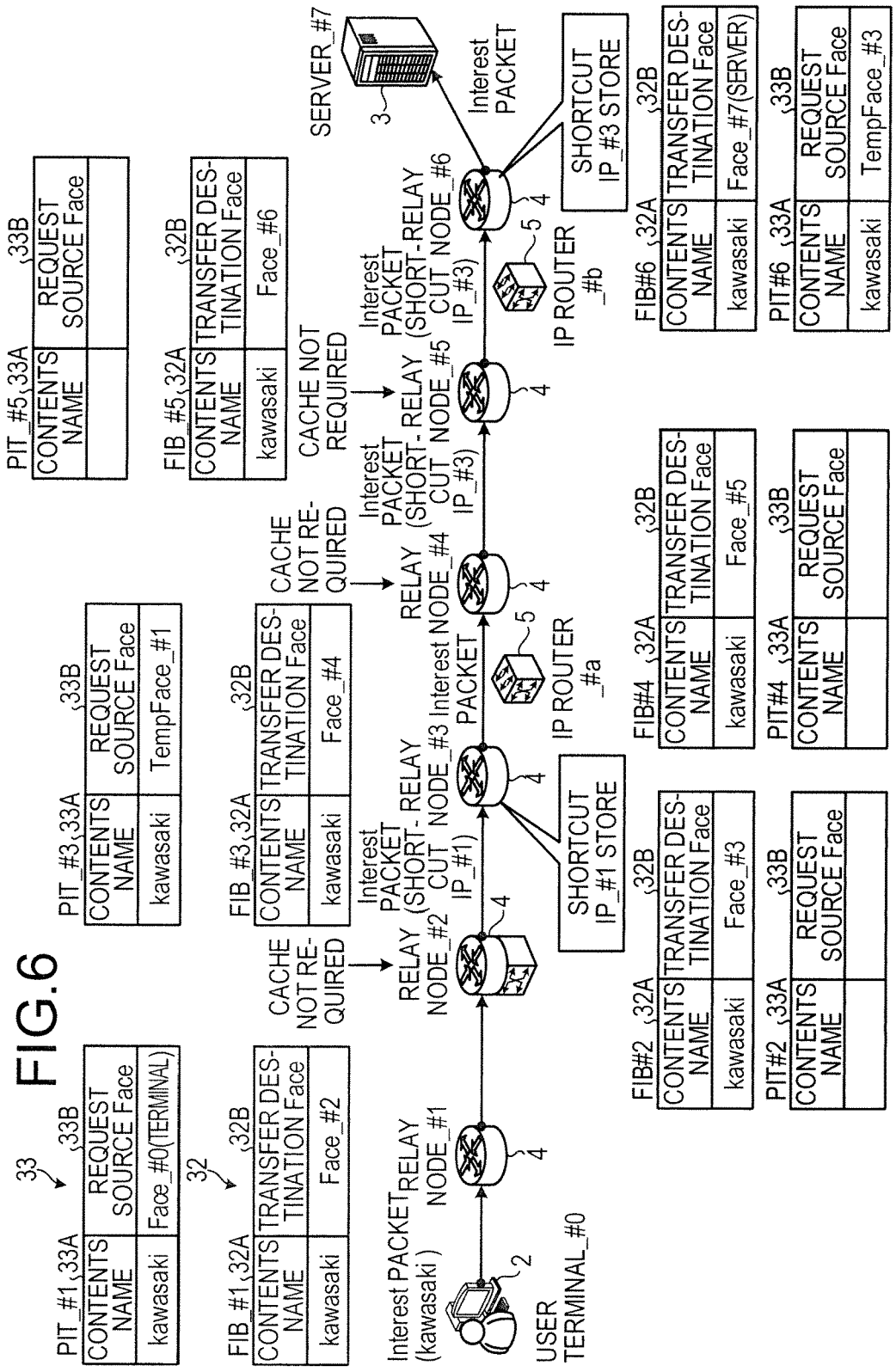
FIG. 6 is an explanatory view illustrating an example of a processing operation in a CCN system related to contents request processing.

Next, the operation of the CCN system 1 according to the first embodiment will be described. FIG. 6 is an explanatory view illustrating an example of a processing operation in the CCN system 1 related to contents request processing. A user terminal 2_#0 transmits an Interest packet including a contents name "Kawasaki" to a relay node 4_#1. Upon receiving the Interest packet from the user terminal 2_#0, since the relay node 4_#1 determines that a cache is required, the relay node 4_#1 sets the request source Face 33B corresponding to the contents name 33A in the Interest packet as "Face_#0" to update a PIT 33_#1. Here, Face_#0 is a Face addressed to the user terminal 2_#0. Then, the relay node 4_#1 refers to "Face_#2" of a transfer destination Face 32B corresponding to a contents name 32A of the Interest packet in a FIB 32_#1 to transfer the Interest packet to a relay node 4_#2. The source address in the Interest packet includes "Face_#1" of the relay node 4_#1.

Upon receiving the Interest packet from the relay node 4_#1, since the relay node 4_#2 determines that no cache is required, the relay node 4_#2 adds an IP address corresponding to "Face_#1" of the relay node 4_#1 to the shortcut IP in the Interest packet without updating a PIT 33_#2. Then, the relay node 4_#2 refers to "Face_#3" as the transfer destination Face 32B corresponding to the contents name 32A of the Interest packet in the FIB 32_#2 to transfer the Interest packet to the relay node 4_#3. The shortcut IP in the Interest packet contains the IP address corresponding to "Face_#1" of the relay node 4_#1.

Upon receiving the Interest packet from the relay node 4_#2, since the relay node 4_#3 determines that a cache is required, the relay node 4_#3 acquires an IP address corresponding to "Face_#1" from the shortcut IP in the Interest packet. The relay node 4_#3 sets the request source Face 33B corresponding to the contents name 33A in the Interest packet as "Temp Face_#1" and updates the PIT 33_#3. Further, the relay node 4_#3 deletes the shortcut IP from the Interest packet. Then, the relay node 4_#3 refers to "Face_#4" as the transfer destination Face 326 corresponding to the contents name 32A of the Interest packet in the FIB 32_#3 to transfer the Interest packet to a relay node 4_#4. The source address in the Interest packet contains "Face_#3" of the relay node 4_#3.

Upon receiving the Interest packet from the relay node 4_#3, since the relay node 4_#4 determines that no cache is required, the relay node 4_#4 does not update a PIT 33_#4 and determines whether or not there is a shortcut IP in the Interest packet. Since there is no shortcut IP in the Interest packet, the relay node 4_#4 adds an IP address corresponding to "Face_#3," which is the address of the relay node 4_#3, to the shortcut IP in the Interest packet. Then, the relay node 4_#4 refers to "Face_#5" as the transfer destination Face 32B corresponding to the contents name 32A of the Interest packet in the FIB 32_#4 to transfer the Interest packet to a relay node 4_#5. The shortcut IP in the Interest packet contains the IP address corresponding to "Face_#3" of the relay node 4_#3.

Upon receiving the Interest packet from the relay node 4_#4, since the relay node 4_#5 determines that no cache is required, the relay node 4_#5 does not update a PIT 33_#5 and determines whether or not there is a shortcut IP in the Interest packet. Since there is a shortcut IP in the Interest packet, the relay node 4_#5 maintains the IP address corresponding to "Face_#3" of the shortcut IP in the Interest packet. Then, the relay node 4_#5 refers to "Face_#6" as the transfer destination Face 32B corresponding to the contents name 32A of the Interest packet in the FIB 32_#5 to transfer the Interest packet to a relay node 4_#6. The shortcut IP in the Interest packet contains the IP address corresponding to "Face_#3" of the relay node 4_#3.

Upon receiving the Interest packet from the relay node 4_#5, since the relay node 4_#6 determines that a cache is required, the relay node 4_#6 determines whether or not there is a shortcut IP in the Interest packet. Since there is a shortcut IP in the Interest packet, the relay node 4_#6 acquires an IP address corresponding to "Face_#3" of the shortcut IP. Further, the relay node 4_#6 sets the request source Face 33B corresponding to the contents name 33A in the Interest packet as "Temp Face_#3" and updates the PIT 33_#6. Further, the relay node 4_#6 deletes the shortcut IP from the Interest packet. Then, the relay node 4_#6 refers to "Face_#7" as the transfer destination Face 32B corresponding to the contents name 32A of the Interest packet in the FIB 32_#6 to transfer the Interest packet to the server 3. Here, Face_#7 is a Face addressed to the server 3. The source address in the Interest packet contains "Face_#6" of the relay node 4_#6. As a result, the server 3 may receive Interest packets from the user terminal 2_#0.

Figure 7:
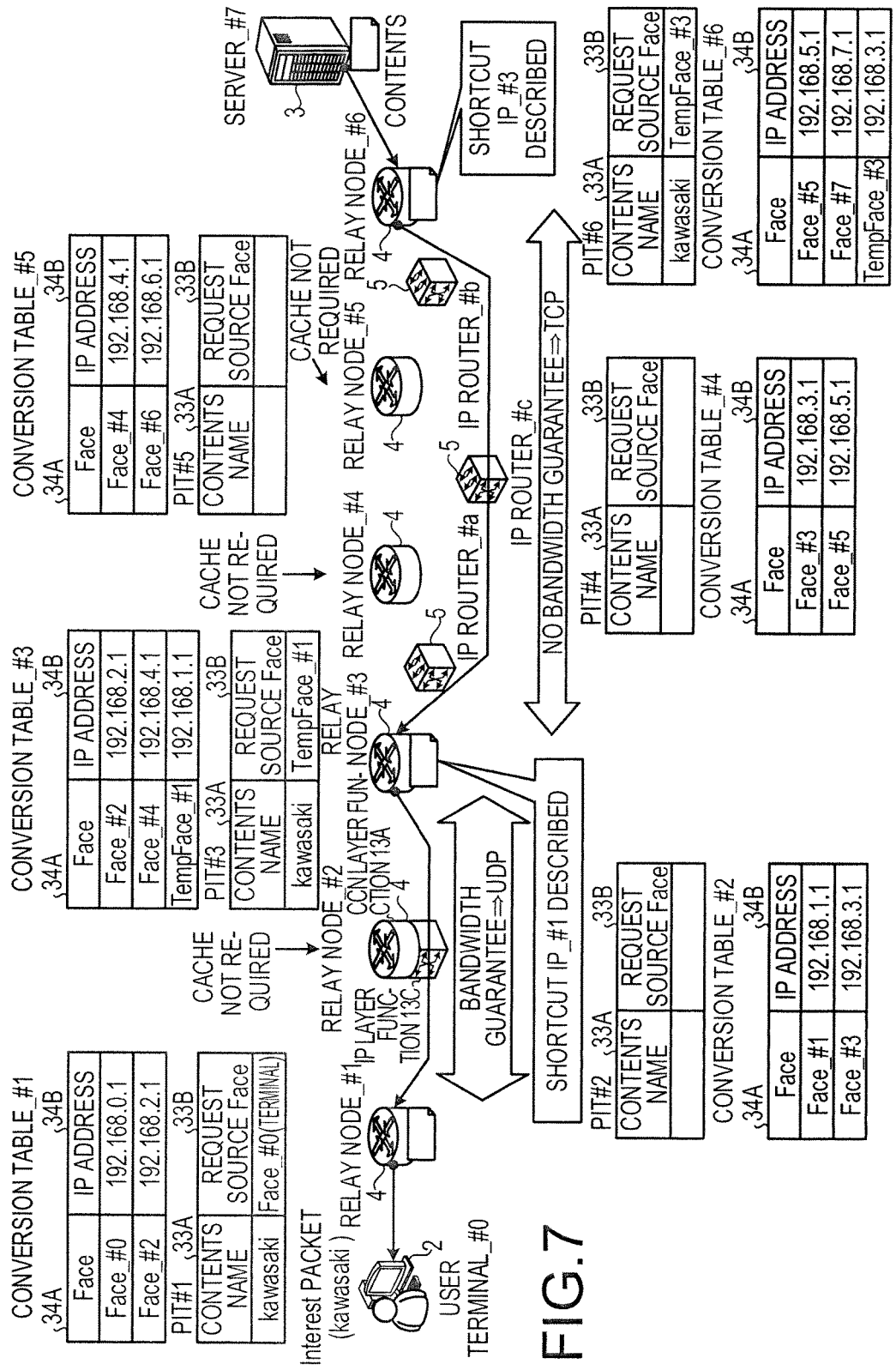
FIG. 7 is an explanatory view illustrating an example of a processing operation in a CCN system related to contents transfer processing.

FIG. 7 is an explanatory view illustrating an example of a processing operation in the CCN system 1 related to contents transfer processing. Upon receiving the Interest packet from the relay node 4_#6, the server 3 illustrated in FIG. 7 transfers request contents of the Interest packet to the relay node 4_#6.

Upon receiving the request contents of the Interest packet from the server 3, since the relay node 4_#6 determines that a cache is required, the relay node 4_#6 saves the received contents in the cache 31. Further, the relay node 4_#6 refers to the PIT 33_#6 to acquire "Temp Face_#3" as the request source Face 33B corresponding to the contents name 33A of the received contents. Further, the relay node 4_#6 refers to a conversion table 34_#6 to convert "Temp Face_#3" of the acquired Face 34A into an IP address 34B "192.168.3.1".

Further, the relay node 4_#6 forms a shortcut path for the relay node 4_#3 based on the IP address 346 corresponding to the Face 34A. In this case, the shortcut path is a path of relay node 4_#6→IP router 5_#c→relay node 4_#3. The relay node 4_#6 transfers the IP packet of the received contents to the IP router 5_#c at the IP layer. Further, the IP router 5_#c transfers the IP packet of the received contents to the relay node 4_#3.

Upon receiving the received contents from the IP router 5_#c, since the relay node 4_#3 determines that a cache is required, the relay node 4_#3 caches the received contents in the cache 31. Further, the relay node 4_#3 refers to the PIT 33_#3 to acquire "Temp Face_#1" as the request source Face 33B corresponding to the contents name 33A of the received contents. Further, the relay node 4_#3 refers to the conversion table 34_#3 to convert "Temp Face_#1" of the Face 34A into an IP address 34B "192.168.1.1." Further, the relay node 4_#3 forms a shortcut path for the relay node 4_#1 based on the IP address corresponding to "Temp Face_#1" corresponding to the request source Face 33B. In this case, the shortcut path is a path of relay node 4_#3→IP layer function 13C in relay node_#2→relay node 4_#1. The relay node 4_#3 transfers the received contents to the IP layer function 13C in the relay node 4_#2 at the IP layer.

The IP layer function 13C in the relay node 4_#2 relays the received contents to the relay node 4_#1 at the IP layer. Upon receiving the received contents, the relay node 4_#1 refers to the PIT 33_#1 and also refers to "Face_#0" as the request source Face 33B corresponding to the contents name 33A of the received contents to transfer the received contents to the user terminal 2_#0. As a result, the user terminal 2_#0 may acquire desired received contents specified by the Interest packet.

The relay node 4_#6 deletes the relay nodes 4_#4 and #5 requiring no cache on a path through which Interest packets are transferred, from the Hop-by-Hop communication and forms a shortcut path to the relay node 4_#3. The relay node 4_#6 uses this shortcut path to transfer the received contents to the IP layer. In other words, as a result of eliminating the need to pass through the relay nodes 4_#4 and #5, a path between the relay node 4_#6 and the relay node 4_#3 goes through the IP router 5_#c without going through the relay nodes 4_#4 and #5 and the IP routers 5_#a and #b. If this shortcut path is not used, the IP routers 5_#a transfers the IP packets between the relay nodes 4_#3 and the relay nodes 4_#4. If it is not also used, the IP routers 5_#b transfers the IP packets between the relay nodes 4_#5 and the relay nodes 4_#6. The IP router 5_#c does not terminate the communication and gets away with only IP relaying of the IP packet. In addition, when the QoS allowing the performance of a path of relay node 4_#6→IP router 5_#c→relay node 4_#3 is set to no bandwidth guarantee, a TCP is selected as a transport protocol. Then, the TCP control unit 25 in the relay node 4_#6 establishes a TCP connection in the shortcut path to the relay node 4_#3 and uses the TCP connection to transfer the received contents.

The relay node 4_#3 deletes the relay node 4_#2 requiring no cache on a path through which Interest packets are transferred, from the Hop-by-Hop communication and forms a shortcut path to the relay node 4_#1. The relay node 4_#3 uses this shortcut path to transfer the received contents to the IP layer. In other words, as a result of eliminating the need to pass through the CCN layer function 13A of the relay node 4_#2, a path between the relay node 4_#3 and the relay node 4_#1 goes through the IP layer function 13C of the relay node 4_#2 without going through the CCN layer function 13A of the relay node 4_#2. Moreover, when using the CCN layer function 13A in the relay node 4_#2, it is necessary to terminate the communication once and replace it with a new communication. That is, the CCN layer function 13A utilizes the IP layer function 13C to collect IP packets storing the divided data of the received contents, forms the received contents with the divided data in the collected IP packets, and saves the received contents in the cache 31. In contrast, the IP layer function 13C does not terminate the communication and gets away with only IP relaying of the IP packet storing the divided data of the received contents to the next hop with the same granularity. When the QoS allowing the performance of a path of relay node 4_#3→IP layer function 13C of relay node 4_#2→relay node 4_#1 is set to be a bandwidth guarantee, a UDP is selected as a transport protocol. Then, the UDP control unit 26 in the relay node 4_#3 establishes a UDP connection in the shortcut path to the relay node 4_#1 and uses the UDP connection to transfer the received contents.

Figure 8:
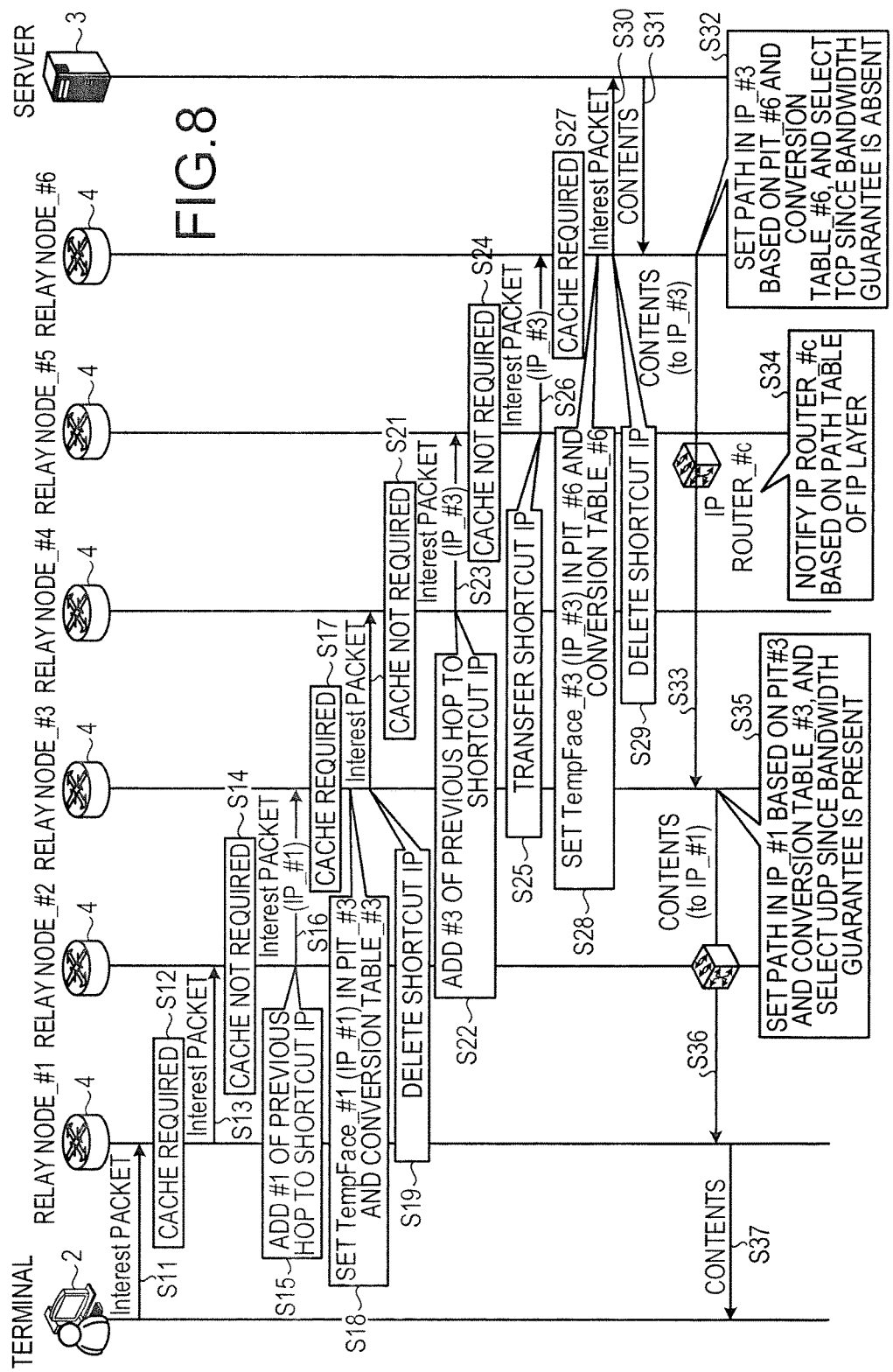
FIG. 8 is a sequence diagram illustrating an example of a series of processing operations in a CCN system from contents request to contents acquisition.

FIG. 8 is a sequence diagram illustrating an example of a processing operation of the CCN system 1 from contents request to contents acquisition. The user terminal 2_#0 illustrated in FIG. 8 notifies an Interest packet to the relay node 4_#1 (operation S11). The Interest control unit 21 in the relay node 4_#1 receives the Interest packet from the user terminal 2. Then, the cache control unit 22 in the relay node 4_#1 determines whether or not a cache is required, based on a contents name in the Interest packet. When it is determined that a cache is required (operation S12), the Interest control unit 21 in the relay node 4_#1 transfers the Interest packet to the relay node 4_#2 (operation S13).

The cache control unit 22 in the relay node 4_#2 receives the Interest packet from the relay node 4_#1 and determines whether or not a cache is required, based on a contents name in the Interest packet. When it is determined that no cache is required (operation S14), the Interest control unit 21 in the relay node 4_#2 adds an IP address corresponding to "Face_#1" of the relay node 4_#1, which is the previous hop, to a shortcut IP in the Interest packet (operation S15). The Interest control unit 21 in the relay node 4_#2 transfers the Interest packet with the IP address corresponding to "Face_#1" added to the shortcut IP to the relay node 4_#3 (operation S16).

The cache control unit 22 in the relay node 4_#3 receives the Interest packet from the relay node 4_#2 and determines whether or not a cache is required, based on a contents name in the Interest packet. When it is determined that a cache is required (operation S17), the Interest control unit 21 in the relay node 4_#3 updates an IP address corresponding to "Face_#1" of the shortcut IP to the PIT 33_#3 and the conversion table 34_#3 (operation S18). The PIT 33_#3 updates the contents name "Kawasaki" and the request source Face "Temp Face_#1." The conversion table 34_#3 updates the IP address of the shortcut IP and "Temp Face_#1." The Interest control unit 21 in the relay node 4_#3 deletes the shortcut IP from the Interest packet (operation S19) and transfers the Interest packet to the relay node 4_#4 (operation S20).

The cache control unit 22 in the relay node 4_#4 receives the Interest packet from the relay node 4_#3 and determines whether or not a cache is required, based on a contents name in the Interest packet. When it is determined that no cache is required (operation S21), the Interest control unit 21 in the relay node 4_#4 adds an IP address corresponding to "Face_#3" of the relay node 4_#3, which is the previous hop, to the shortcut IP in the Interest packet (Operation S22). The Interest control unit 21 in the relay node 4_#4 transfers the Interest packet with the IP address corresponding to "Face_#3" added to the shortcut IP to the relay node 4_#5 (operation S23).

The cache control unit 22 in the relay node 4_#5 receives the Interest packet from the relay node 4_#4 and determines whether or not a cache is required, based on a contents name in the Interest packet. When it is determined that no cache is required (operation S24), the Interest control unit 21 in the relay node 4_#5 does not update the shortcut IP in the Interest packet (operation S25) and transfers the Interest packet to the relay node 4_#6 (operation S26). The cache control unit 22 in the relay node 4_#6 receives the Interest packet from the relay node 4_#5 and determines whether or not a cache is required, based on a contents name in the Interest packet. When it is determined that a cache is required (operation S27), the Interest control unit 21 in the relay node 4_#6 updates an IP address corresponding to "Face_#3" of the shortcut IP to the PIT 33_#6 and the conversion table 34_#6 (operation S28). The PIT 33_#6 updates the contents name "Kawasaki" and the request source Face "Temp Face_#3." The conversion table 34_#6 updates the IP address of the shortcut IP and "Temp Face_#3." The relay node 4_#6 deletes the shortcut IP from the Interest packet (operation S29) and transfers the Interest packet to the server 3 (operation S30).

Upon receiving the Interest packet, the server 3 acquires contents corresponding to the contents name in the Interest packet from a storage destination and transfers the acquired contents to the relay node 4_#6 (operation S31). Upon receiving the contents, the path setting unit 24 in the relay node 4_#6 sets a shortcut path for the relay node 4_#3 based on the PIT 33_#6 and the conversion table 34_#6 (operation S32). As for the shortcut path, a path of relay node 4_#6→IP router 5_#c→relay node 4_#3 is set, and a TCP is selected since a bandwidth guarantee is absent in the shortcut path.

The contents transfer unit 23 in the relay node 4_#6 uses the set path to transfer the received contents to the relay node 4_#3 (operation S33). At this time, upon receiving the received contents from the relay node 4_#6, the IP router 5_#c on the shortcut path refers to a routing table of the IP layer to pass the IP packet of the received contents and transfers the passed IP packet to the relay node 4_#3 (operation S34).

Upon receiving the received contents, the path setting unit 24 in the relay node 4_#3 sets a shortcut path for the relay node 4_#1 based on the PIT 33_#3 and the conversion table 34_#3 (operation S35). As for the shortcut path, a path of relay node 4_#3→IP layer function 13C in relay node 4_#2→relay node 4_#1 is set, and a UDP is selected since a bandwidth guarantee is present in the shortcut path. The IP layer function 13C in the relay node 4_#2 passes the IP packet of the received contents from the relay node 4_#3 and transfers the passed IP packet of the received contents to the relay node 4_#1 (operation S36).

Further, the content transfer unit 23 in the relay node 4_#1 receives the received contents from the IP layer function 13C in the relay node 4_#2 and transfers the received contents to the user terminal 2 (operation S37).

Figure 9:
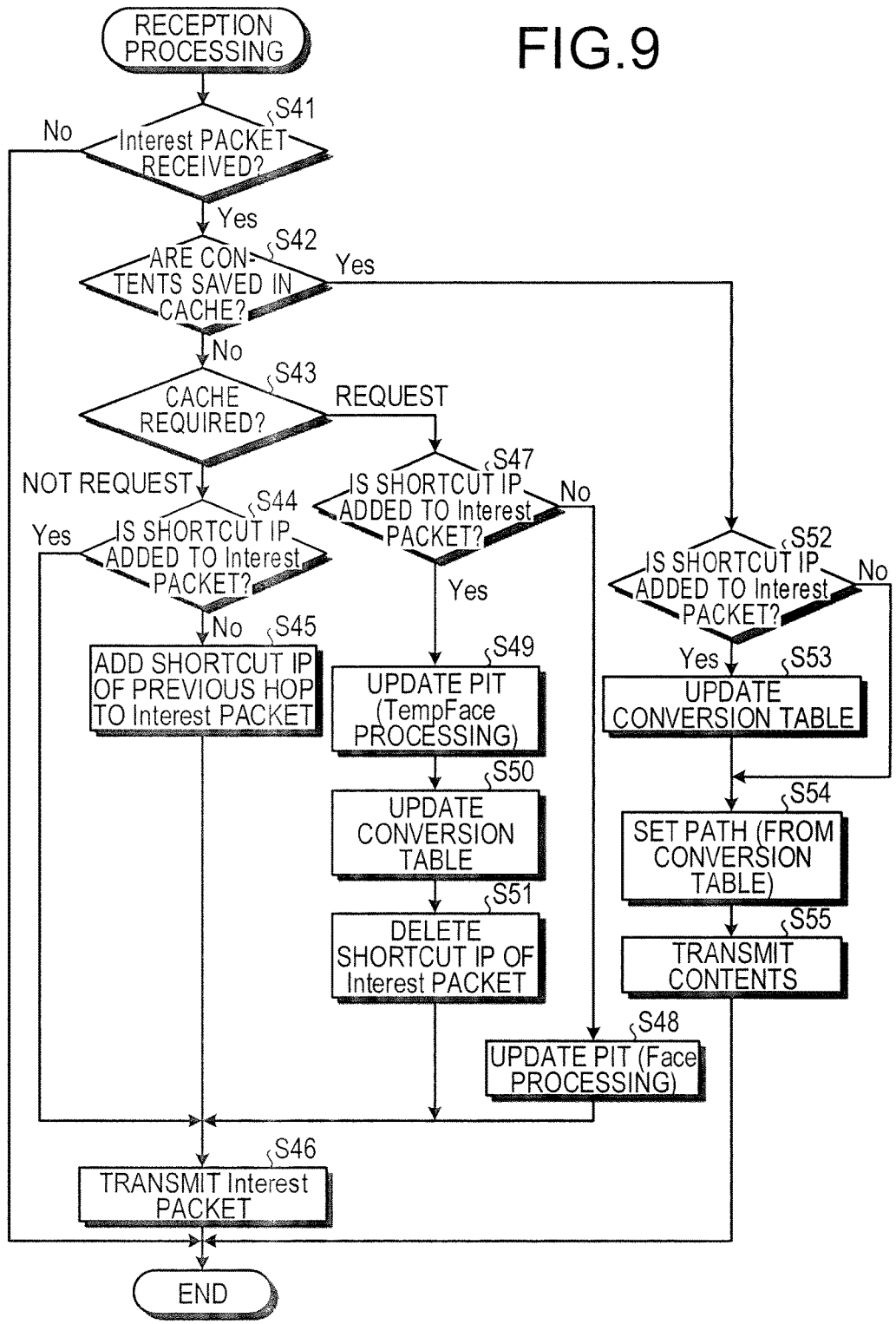
FIG. 9 is a flowchart illustrating an example of a processing operation of a relay node related to reception processing.

FIG. 9 is a flowchart illustrating an example of a processing operation of the relay node 4 related to reception processing. The Interest control unit 21 in the relay node 4 illustrated in FIG. 9 determines whether or not an Interest packet has been received (operation S41). When it is determined that an Interest packet has been received ("Yes" in operation S41), the Interest control unit 21 in the relay node 4 determines whether or not contents are saved in the cache 31 (operation S42).

When it is determined that no contents are saved in the cache 31 ("No" in operation S42), the cache control unit 22 in the relay node 4 determines whether or not a cache is required (operation S43). When it is determined the no cache is required ("Not required" in operation S43), the Interest control unit 21 in the relay node 4 determines whether or not a shortcut IP is added to the Interest packet (operation S44). When it is determined that a shortcut IP is not added to the Interest packet ("No" in operation S44), the Interest control unit 21 in the relay node 4 adds a shortcut IP of the previous hop to the Interest packet (operation S45). The Interest control unit 21 transfers the Interest packet to the next hop (operation S46). Then, the Interest control unit 21 in the relay node 4 transfers the Interest packet to the next hop and then ends the processing operation illustrated in FIG. 9. When it is determined that a shortcut IP is added to the Interest packet ("Yes" in operation S44), the Interest control unit 21 in the relay node 4 proceeds to the operation S46 so as to transfer the Interest packet to the next hop without changing the shortcut IP.

When it is determined that a cache is required ("Required" in operation S43), the Interest control unit 21 in the relay node 4 determines whether or not a shortcut IP is added to the Interest packet (operation S47). When it determined that no shortcut IP is added to the Interest packet ("No" in operation S47), the relay node 4 updates the PIT 33 with a Face of the previous hop as a request source Face (operation S48). Then, the relay node 4 proceeds to the operation S46 so as to transfer the Interest packet to the next hop.

When it is determined that the shortcut IP is added to the Interest packet ("Yes" in operation S47), the Interest control unit 21 updates the PIT 33 with a Face corresponding to an IP address added to the shortcut IP as a request source Face (operation S49). Further, the Interest control unit 21 in the relay node 4 updates the conversion table 34 (operation S50), deletes the shortcut IP of the Interest packet (operation S51), and proceeds to the operation S46 so as to transfer the Interest packet to the next hop.

When it is determined that contents are saved in the cache 31 ("Yes" in operation S42), the Interest control unit 21 in the relay node 4 determines whether or not a shortcut IP is added to the Interest packet (operation S52). When it is determined that a shortcut IP is added to the Interest packet ("Yes" in operation S52), the Interest control unit 21 in the relay node 4 updates the conversion table 34 (operation S53). Furthermore, the path setting unit 24 in the relay node 4 sets a shortcut path based on the contents of the conversion table 34 (operation S54). The contents transfer unit 23 in the relay node 4 distributes the received contents after setting the path (operation S55), and ends the processing operation illustrated in FIG. 9.

When it is determined that no shortcut IP is added to the Interest packet ("No" in operation S52), the path setting unit 24 in the relay node 4 proceeds to operation S54 so as to set a shortcut path based on the contents of the conversion table 34.

Figure 10:
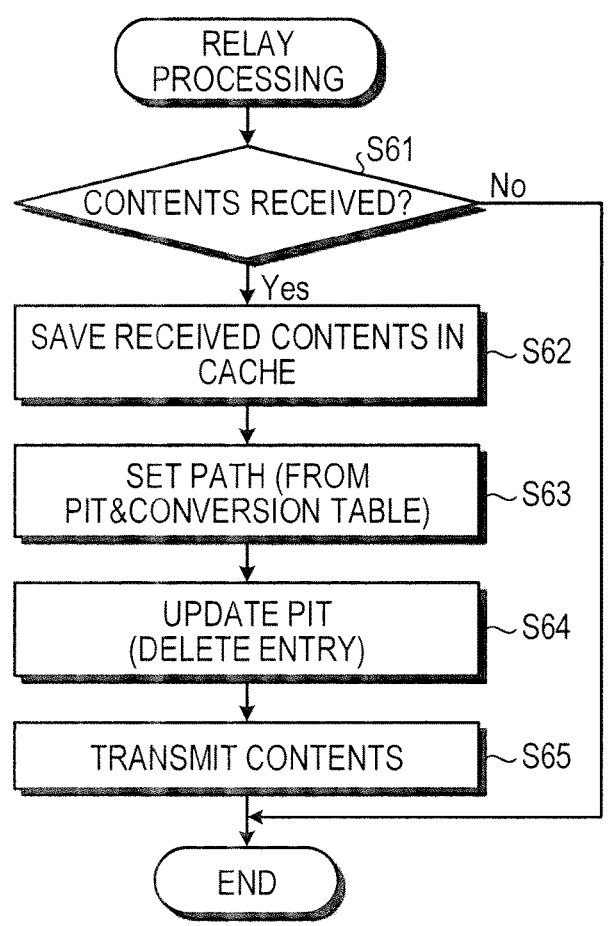
FIG. 10 is a flowchart illustrating an example of a processing operation of a relay node related to relay processing.

FIG. 10 is a flowchart illustrating an example of a processing operation of the relay node 4 related to contents relay processing. The cache control unit 22 in the relay node 4 illustrated in FIG. 10 determines whether or not contents have been received (operation S61). When it is determined that contents have been received ("Yes" in operation S61), the cache control unit 22 in the relay node 4 saves the received contents in the cache 31 (operation S62). Further, when the received contents are saved in the cache 31, the path setting unit 24 in the relay node 4 refers to the contents of the PIT 33 and the conversion table 34 to set a shortcut path for transferring the received contents (operation S63).

The contents transfer unit 23 in the relay node 4 updates the contents of the PIT 33 (operation S64), transfers the received contents to the request source Face (operation S65), and ends the processing operation illustrated in FIG. 10. When it is determined that no contents have been received ("No" in operation S61), the relay node 4 ends the processing operation illustrated in FIG. 10.

Upon receiving the contents, the relay node 4 saves the received contents in the cache 31. The relay node 4 sets a shortcut path of the received contents based on a request source Face corresponding to the received contents in the PIT 33 and the conversion table 34 and an IP address corresponding to the request source Face. Further, the relay node 4 transfers the received contents via the shortcut path.

In the CCN system 1 according to the first embodiment, among relay nodes 4 on a path through which Interest packets are transferred, a relay node 4 requiring no cache is deleted to form a shortcut path. As a result, it is possible to execute optimal routing from the server 3 or a relay node 4 that stores the received contents in the cache 31 to the user terminal 2, thereby increasing the transfer rate of the received contents.

In the CCN system 1, since the received contents are transferred to the IP layer even under the condition that relay nodes 4 and IP routers 5 are mixed in a shortcut path, the transfer rate of the received contents may be increased.

Further, in the CCN system 1, when QoS of the shortcut path for transferring the received contents has no bandwidth guarantee, a TCP connection is established on the shortcut path. As a result, the congestion control and retransmission control may be ensured on the shortcut path for transferring the received contents.

Further, in the CCN system 1, when the QoS of the shortcut path for transferring the received contents has bandwidth guarantee, a UDP connection is established on the shortcut path. As a result, it is unnecessary to execute congestion control and retransmission control on the shortcut path for transferring the received contents, thereby suppressing the processing load.

Second Embodiment

Figure 11:
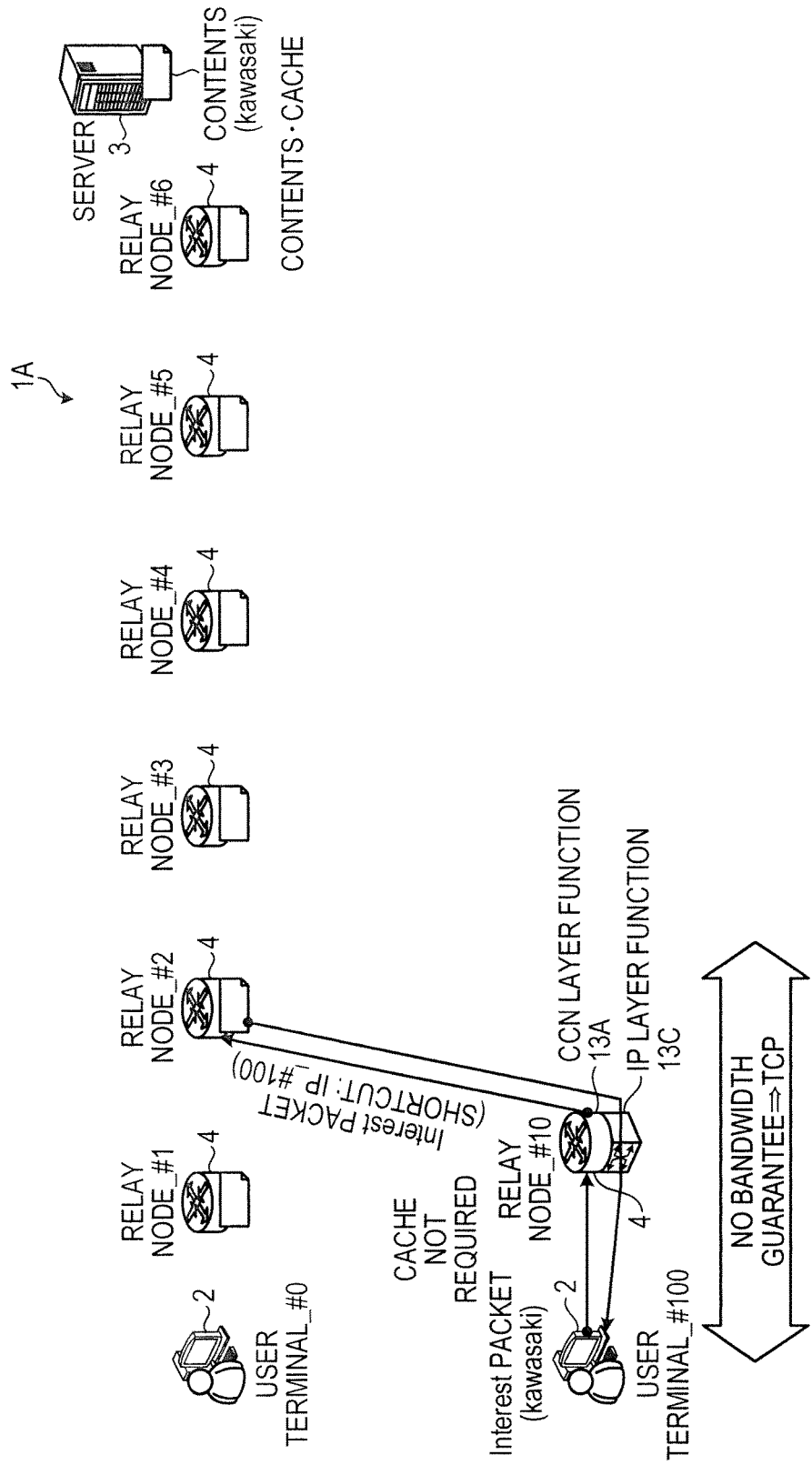
FIG. 11 is an explanatory view illustrating an example of a processing operation from contents request to contents acquisition in a CCN system according to a second embodiment.

FIG. 11 is an explanatory view illustrating an example of a processing operation from contents request to contents acquisition of a CCN system 1A according to a second embodiment. In FIG. 11, the same components as those of the CCN system 1 of the first embodiment will be denoted by the same reference numerals as used in the first embodiment, and explanation thereof will be omitted.

It is assumed that the relay nodes 4_#1 to #6 in the CCN system 1A illustrated in FIG. 11 have saved contents including the contents name "Kawasaki" in their respective caches 31. In the CCN system 1A, an Interest packet including the contents name "Kawasaki" is transmitted from a user terminal 2_#100 to a relay node 4_#10.

Upon receiving the Interest packet from the user terminal 2_#100, since the relay node 4_#10 determines that no cache is required, a CCN layer function 13A in the relay node 4_#10 does not update a PIT 33_#10. Further, the CCN layer function 13A adds an IP address corresponding to "Face_#100" of the user terminal 2_#100 to a shortcut IP in the Interest packet. Then, the relay node 4_#10 refers to "Face_#2" as a transfer destination Face 32B corresponding to a contents name 32A of the Interest packet in a FIB 32_#10 to transfer the Interest packet to the relay node 4_#2.

Upon receiving the Interest packet including the IP address corresponding to "Face_#100" as the shortcut IP, the relay node 4_#2 determines whether or not the contents of the contents name has been saved in the cache 31, based on the contents name in the Interest packet. When it is determined that the contents have been saved in the cache 31, the relay node 4_#2 determines whether or not a shortcut IP is added to the Interest packet. When it is determined that a shortcut IP is added, the relay node 4_#2 updates the IP address corresponding to "Face_#100" of the shortcut IP to the PIT 33 and the conversion table 34. The PIT 33_#2 updates the contents name "Kawasaki" and "Face_#100." The conversion table 34_#2 updates the shortcut IP and "Face_#100." The relay node 4_#2 acquires from the cache 31 the received contents corresponding to the contents name in the Interest packet. Further, the relay node 4_#2 forms a shortcut path to the user terminal 2_#100 based on an IP address corresponding to a request source Face (Face_#100) corresponding to the contents name in the PIT 33. In this case, the shortcut path is a path of relay node 4_#2→IP layer function 13C of relay node 4_#10→user terminal 2_#100. When QoS on the shortcut path of relay node 4_#2→IP layer function 13C of relay node 4_#10→user terminal 2_#100 has no bandwidth guarantee, the relay node 4_#2 establishes a TCP connection in the shortcut path. The relay node 4_#2 transfers the IP packet of the received contents to the IP layer function 13C of the relay node 4_#10 at the IP layer.

The IP layer function 13C of the relay node 4_#10 transfers the received contents from the relay node 4_#2 to the user terminal 2_#100 at the IP layer. As a result, since the IP layer function 13C of the relay node 4_#10 does not pass through the CCN layer function 13A, the IP layer function 13C gets away with only IP relaying of the IP packet of the received contents to the IP layer. Then, the user terminal 2_#100 may acquire the received contents from the relay node 4_#2 via the IP layer function 13C of the relay node 4_#10.

In the CCN system 1A according to the second embodiment, under the condition that a relay node 4 on a path from the user terminal 2_#100 to the server 3 caches contents, the CCN layer function 13A of the relay node 4_#10 requiring no cache is excluded from Hop-by-Hop communication. Then, the CCN system 1A may increase the transfer rate of the contents while selecting a suitable transport protocol according to the set contents of the QoS allowing the performance of the shortcut path.

Third Embodiment

Figure 12:
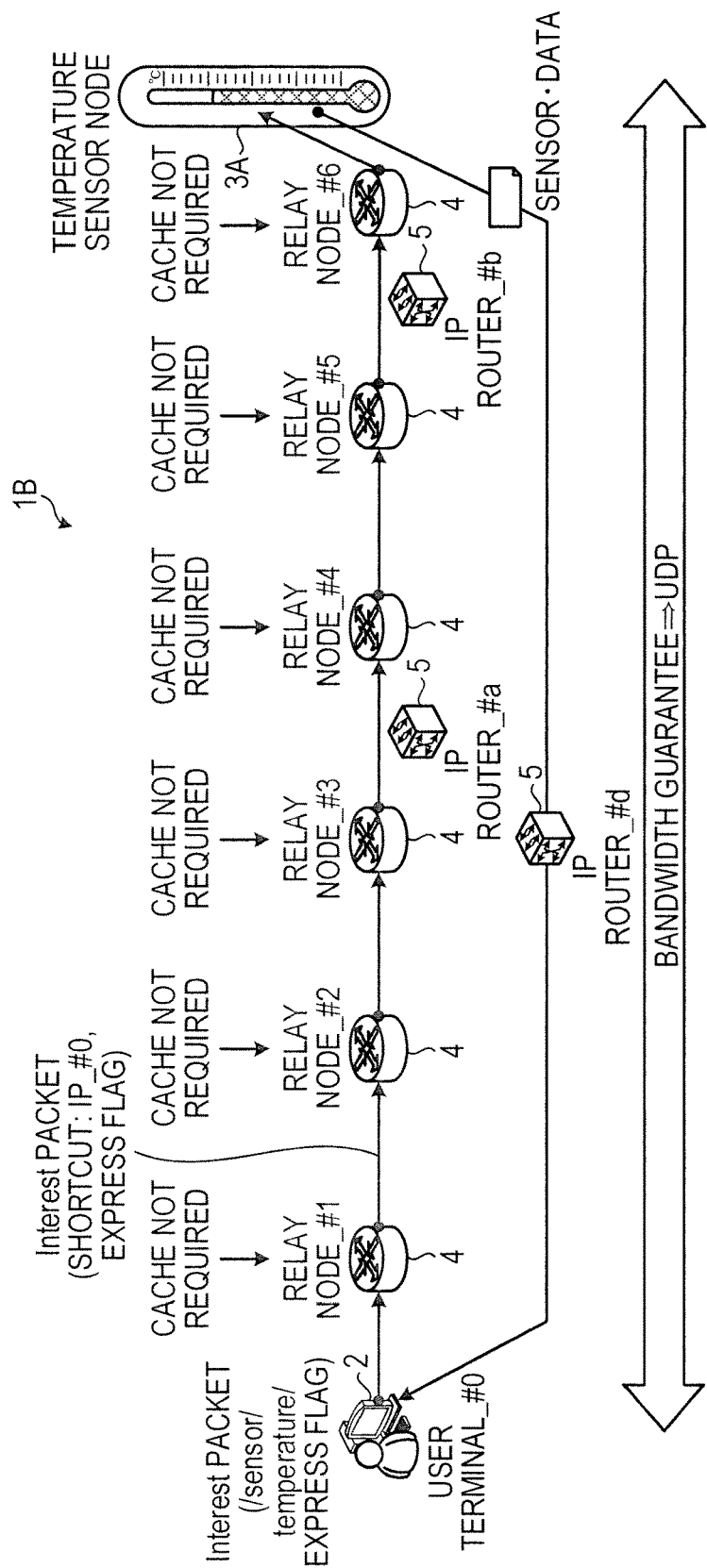
FIG. 12 is an explanatory view illustrating an example of a processing operation from contents request to contents acquisition of a CCN system according to a third embodiment.

FIG. 12 is an explanatory view illustrating an example of a processing operation from contents request to contents acquisition of a CCN system 1B according to a third embodiment. In FIG. 12, the same components as those of the CCN system 1 of the first embodiment will be denoted by the same reference numerals as used in the first embodiment, and explanation thereof will be omitted.

The CCN system 1B illustrated in FIG. 12 replaces the server 3 storing contents with a temperature sensor node 3A that detects a temperature as contents and stores temperature data as a result of the detection. The temperature sensor node 3A is a node capable of communicating with the relay nodes 4 and the IP routers 5.

It is assumed that the user terminal 2#0 desires data such as the latest temperature detected by the temperature sensor node 3A, rather than the contents stored in the caches 31 in the relay nodes 4.

The user terminal 2_#0 adds an express flag to an Interest packet including a contents name "/sensor/temperature" and transmits the Interest packet to the relay node 4_#1. Upon receiving the Interest packet, the relay node 4_#1 determines that no contents cache is required, based on the express flag in the Interest packet. Further, the relay node 4_#1 adds an IP address corresponding to Face_#0 of the user terminal 2_#0 to the shortcut IP in the Interest packet and transfers the Interest packet to the relay node 4_#2 of the next hop.

Upon receiving the Interest packet from the relay node 4_#1, the relay node 4_#2 determines that no contents cache is required, based on the express flag in the Interest packet. Further, the relay node 4_#2 determines whether or not a shortcut IP in the Interest packet is added. When it is determined that a shortcut IP is added, the relay node 4_#2 transfers the Interest packet to the relay node 4_#3, which is the next hop, without changing the shortcut IP (IP address corresponding to Face_#0).

Upon receiving the Interest packet from the relay node 4_#2, the relay node 4_#3 determines that no contents cache is required, based on the express flag in the Interest packet. Further, the relay node 4_#3 determines whether or not a shortcut IP in the Interest packet is added. When it is determined that a shortcut IP is added, the relay node 4_#3 transfers the Interest packet to the relay node 4_#4, which is the next hop, without changing the shortcut IP (IP address corresponding to Face_#0).

Upon receiving the Interest packet from the relay node 4_#3, the relay node 4_#4 determines that no contents cache is required, based on the express flag in the Interest packet. Further, the relay node 4_#4 determines whether or not a shortcut IP in the Interest packet is added. When it is determined that a shortcut IP is added, the relay node 4_#4 transfers the Interest packet to the relay node 4_#5, which is the next hop, without changing the shortcut IP (IP address corresponding to Face_#0).

Upon receiving the Interest packet from the relay node 4_#4, the relay node 4_#5 determines that no contents cache is required, based on the express flag in the Interest packet. Further, the relay node 4_#5 determines whether or not a shortcut IP in the Interest packet is added. When it is determined that a shortcut IP is added, the relay node 4_#5 transfers the Interest packet to the relay node 4_#6, which is the next hop, without changing the shortcut IP (IP address corresponding to Face_#0).

Upon receiving the Interest packet from the relay node 4_#5, the relay node 4_#6 determines that no contents cache is required, based on the express flag in the Interest packet. Further, the relay node 4_#6 determines whether or not a shortcut IP in the Interest packet is added. When it is determined that a shortcut IP is added, the relay node 4_#6 transfers the Interest packet to the temperature sensor node 3A, which is the next hop, without changing the shortcut IP (IP address corresponding to Face_#0).

Upon receiving the Interest packet, the temperature sensor node 3A determines whether or not temperature data corresponding to a contents name has been saved in the cache, based on the contents name in the Interest packet. When it is determined that temperature data corresponding to a content name has been stored in the cache, the temperature sensor node 3A forms a shortcut path based on a shortcut IP in the Interest packet, that is, an IP address of the user terminal 2_#0. In this case, the shortcut path is a path of temperature sensor node 3A→IP router 5_#d→user terminal 2_#0. Further, the QoS allowing the performance of the shortcut path is assumed to have a bandwidth guarantee.

The temperature sensor node 3A establishes a UDP connection on the shortcut path and transfers the temperature data to the IP router 5_#d with the UDP connection. Further, the IP router 5_#d uses the UDP connection to transfer the received temperature data to the user terminal 2_#0.

In the CCN system 1B according to the third embodiment, by adding the express flag to the Interest packet, the relay nodes 4 on a path through which Interest packets are transferred is instructed not to require a cache. In the CCN system 1B, the relay nodes 4_#1 to #6 on a path between the user terminal 2_#0 and the temperature sensor node 3A are deleted to form a shortcut path. The temperature sensor node 3A transfers the temperature data to the user terminal 2_#0 via the IP router 5_#d on the shortcut path. As a result, the user terminal 2_#0 may increase the transfer rate when transferring the latest temperature data from the temperature sensor node 3A.

In addition, each component of the respective illustrated units is not necessarily required to be configured physically as illustrated in the drawings. That is, specific forms of distribution and integration of the individual units are not limited to those illustrated in the drawings, and all or some of the units may be configured to be distributed or integrated functionally or physically in arbitrary units according to various loads, usage conditions, etc.

Furthermore, all or some of the various processing functions performed in each device may be executed on a CPU (or a microcomputer such as a micro processing unit (MPU) or a micro controller unit (MCU)). In addition, it is to be understood that all or some of the various processing functions may be executed on a program that is analyzed and executed by a CPU (or a microcomputer such as an MPU or an MCU), or on hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay apparatus comprising:
   a memory; and
   a processor coupled to the memory and configured to:
   receive a first packet including an identifier for indicating a content;
   determine whether the content indicated by the identifier included in the first packet is required to be stored in a cache;
   transmit a second packet including a source address of the first packet and the identifier when determined that the content is not required to be stored in the cache; and
   transmit a third packet including an address of the relay apparatus and the identifier when determined that the content is required to be stored in the cache.

2. The relay apparatus according to claim 1,
   wherein the processor is configured to:
   store the source address of the first packet as an address of a request source corresponding to the identifier; and
   set a path on which the content corresponding to the identifier is transferred, based on the stored source address corresponding to the address of the request source.

3. The relay apparatus according to claim 2,
   wherein the processor is configured to:
   set a transmission control protocol (TCP) when the set path has quality of service (QoS) with no bandwidth guarantee; and
   set an user datagram protocol (UDP) when the set path has the QoS with a bandwidth guarantee.

4. The relay apparatus according to claim 1,
wherein the processor is configured to determine whether or not the content indicated by the identifier is saved in the cache, based on a presence or absence of a predetermined flag in the first packet.

5. The relay apparatus according to claim 2,
wherein the processor is configured to delete the stored source address corresponding to the address of the request source with a lapse of a predetermined time after referring to the stored source address.

6. The relay apparatus according to claim 1, wherein the processor is further configured to:
determine whether the content is stored in the cache,
wherein the processor is configured to determine whether the content is required to be stored in the cache when determined that no content is stored in the cache.

7. The relay apparatus according to claim 6, wherein the processor is configured to:
determine whether a shortcut IP is added to the first packet when determined that the content is stored in the cache;
update a conversion table that stores a transfer destination and a shortcut IP address in association with each other when determined that the shortcut IP is added to the first packet, and set a path on which the content corresponding to the identifier is transferred, based on an updated conversion table; and
set the path based on the conversion table when determined that the shortcut IP is not added to the first packet.

8. The relay apparatus according to claim 1, wherein the processor is configured to:
determine whether a shortcut IP is added to the first packet when determined that the content is not required to be stored in the cache;
add the source address of the first packet as the shortcut IP to the first packet when determined that the shortcut IP is not added to the first packet, and transmit the second packet including the source address of the first packet and the identifier; and
transmit the first packet without changing the shortcut IP when determined that the shortcut IP is added to the first packet.

9. The relay apparatus according to claim 1, wherein the processor is configured to:
delete a shortcut IP in the first packet and add the address of the relay apparatus to the first packet when determined that the content is required to be stored in the cache, and transmit the third packet including the address of the relay apparatus and the identifier.

10. A relay method by a relay apparatus, the method comprising:
receiving a first packet including an identifier for indicating a content;
determining whether the content indicated by the identifier included in the first packet is required to be stored in a cache;
transmitting a second packet including a source address of the first packet and the identifier when determined that the content is not required to be stored in the cache; and
transmitting a third packet including an address of the relay apparatus and the identifier when determined that the content is required to be stored in the cache, by a processor.

* * * * *